US009756222B2

United States Patent
Cabral et al.

(10) Patent No.: US 9,756,222 B2
(45) Date of Patent: Sep. 5, 2017

(54) METHOD AND SYSTEM FOR PERFORMING WHITE BALANCING OPERATIONS ON CAPTURED IMAGES

(71) Applicant: NVIDIA Corporation, Santa Clara, CA (US)

(72) Inventors: Brian Cabral, San Jose, CA (US); Ricardo Motta, Palo Alto, CA (US); Mitchell Harwell, Los Gatos, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 13/927,565

(22) Filed: Jun. 26, 2013

(65) Prior Publication Data

US 2015/0002693 A1   Jan. 1, 2015

(51) Int. Cl.
H04N 1/60      (2006.01)
H04N 9/73      (2006.01)

(52) U.S. Cl.
CPC ........... *H04N 1/6027* (2013.01); *H04N 9/735* (2013.01)

(58) Field of Classification Search
CPC ....................................................... H04N 9/735
USPC ........................................... 348/223.1–224.1
See application file for complete search history.

(56) References Cited

U.S. PATENT DOCUMENTS

| | | | |
|---|---|---|---|
| 3,904,818 A | 9/1975 | Kovac | |
| 4,253,120 A | 2/1981 | Levine | |
| 4,646,251 A | 2/1987 | Hayes et al. | |
| 4,739,495 A | 4/1988 | Levine | |
| 4,771,470 A | 9/1988 | Geiser et al. | |
| 4,920,428 A | 4/1990 | Lin et al. | |
| 4,987,496 A | 1/1991 | Greivenkamp, Jr. | |
| 5,175,430 A | 12/1992 | Enke et al. | |
| 5,261,029 A | 11/1993 | Abi-Ezzi et al. | |

(Continued)

FOREIGN PATENT DOCUMENTS

| | | |
|---|---|---|
| CN | 1275870 | 12/2000 |
| EP | 0392565 | 10/1990 |

(Continued)

OTHER PUBLICATIONS

"A Pipelined Architecture for Real-Time orrection of Barrel Distortion in Wide-Angle Camera Images", Hau, T. Ngo, Student Member, IEEE and Vijayan K. Asari, Senior Member IEEE, IEEE Transaction on Circuits and Sytstems for Video Technology; vol. 15 No. 3 Mar. 2005 pp. 436-444.

(Continued)

*Primary Examiner* — Christopher K Peterson

(57) ABSTRACT

Embodiments of the present invention are operable to perform automatic white balancing operations on images captured by a camera system through the use of weights derived through crowdsourcing procedures. Embodiments of the present invention use crowdsourced weight data resident on the camera system in combination with sampled image data of a captured image to determine a likely illuminant source. When performing automatic white balancing operations on the captured image, embodiments of the present invention may also compute a confidence score which may present the user with a choice to either use the likely illuminant determined using the crowdsourced weights or the camera system's default or normal automatic white balancing correction algorithm.

24 Claims, 6 Drawing Sheets

(56) References Cited

U.S. PATENT DOCUMENTS

| | | |
|---|---|---|
| 5,305,994 A | 4/1994 | Matsui et al. |
| 5,387,983 A | 2/1995 | Sugiura et al. |
| 5,475,430 A | 12/1995 | Hamada et al. |
| 5,513,016 A | 4/1996 | Inoue |
| 5,608,824 A | 3/1997 | Shimizu et al. |
| 5,652,621 A | 7/1997 | Adams, Jr. et al. |
| 5,793,433 A | 8/1998 | Kim et al. |
| 5,878,174 A | 3/1999 | Stewart et al. |
| 5,903,273 A | 5/1999 | Mochizuki et al. |
| 5,905,530 A | 5/1999 | Yokota et al. |
| 5,995,109 A | 11/1999 | Goel et al. |
| 6,016,474 A | 1/2000 | Kim et al. |
| 6,078,331 A | 6/2000 | Pulli et al. |
| 6,111,988 A | 8/2000 | Horowitz et al. |
| 6,118,547 A | 9/2000 | Tanioka |
| 6,141,740 A | 10/2000 | Mahalingaiah et al. |
| 6,151,457 A | 11/2000 | Kawamoto |
| 6,175,430 B1 | 1/2001 | Ito |
| 6,252,611 B1 | 6/2001 | Kondo |
| 6,256,038 B1 | 7/2001 | Krishnamurthy |
| 6,281,931 B1 | 8/2001 | Tsao et al. |
| 6,289,103 B1 | 9/2001 | Sako et al. |
| 6,314,493 B1 | 11/2001 | Luick |
| 6,319,682 B1 | 11/2001 | Hochman |
| 6,323,934 B1 | 11/2001 | Enomoto |
| 6,392,216 B1 | 5/2002 | Peng-Tan |
| 6,396,397 B1 | 5/2002 | Bos et al. |
| 6,438,664 B1 | 8/2002 | McGrath et al. |
| 6,486,971 B1 | 11/2002 | Kawamoto |
| 6,584,202 B1 | 6/2003 | Montag et al. |
| 6,683,643 B1 | 1/2004 | Takayama et al. |
| 6,707,452 B1 | 3/2004 | Veach |
| 6,724,423 B1 | 4/2004 | Sudo |
| 6,724,932 B1 | 4/2004 | Ito |
| 6,737,625 B2 | 5/2004 | Baharav et al. |
| 6,760,080 B1 | 7/2004 | Moddel et al. |
| 6,785,814 B1 | 8/2004 | Usami et al. |
| 6,806,452 B2 | 10/2004 | Bos et al. |
| 6,839,062 B2 | 1/2005 | Aronson et al. |
| 6,856,441 B2 | 2/2005 | Zhang et al. |
| 6,891,543 B2 | 5/2005 | Wyatt |
| 6,900,836 B2 | 5/2005 | Hamilton, Jr. |
| 6,950,099 B2 | 9/2005 | Stollnitz et al. |
| 7,009,639 B1 | 3/2006 | Une et al. |
| 7,015,909 B1 | 3/2006 | Morgan, III et al. |
| 7,023,479 B2 | 4/2006 | Hiramatsu et al. |
| 7,088,388 B2 | 8/2006 | MacLean et al. |
| 7,092,018 B1 | 8/2006 | Watanabe |
| 7,106,368 B2 | 9/2006 | Daiku et al. |
| 7,133,041 B2 | 11/2006 | Kaufman et al. |
| 7,133,072 B2 | 11/2006 | Harada |
| 7,221,779 B2 | 5/2007 | Kawakami et al. |
| 7,227,586 B2 | 6/2007 | Finlayson et al. |
| 7,245,319 B1 | 7/2007 | Enomoto |
| 7,305,148 B2 | 12/2007 | Spampinato et al. |
| 7,343,040 B2 | 3/2008 | Chanas et al. |
| 7,486,844 B2 | 2/2009 | Chang et al. |
| 7,502,505 B2 | 3/2009 | Malvar et al. |
| 7,580,070 B2 | 8/2009 | Yanof et al. |
| 7,587,391 B1 | 9/2009 | Bostock et al. |
| 7,626,612 B2 | 12/2009 | John et al. |
| 7,627,193 B2 | 12/2009 | Alon et al. |
| 7,671,910 B2 | 3/2010 | Lee |
| 7,728,880 B2 | 6/2010 | Hung et al. |
| 7,750,956 B2 | 7/2010 | Wloka |
| 7,817,187 B2 | 10/2010 | Silsby et al. |
| 7,859,568 B2 | 12/2010 | Shimano et al. |
| 7,860,382 B2 | 12/2010 | Grip |
| 8,238,695 B1 | 8/2012 | Davey et al. |
| 8,698,918 B2 | 4/2014 | Silverstein et al. |
| 9,307,213 B2 | 4/2016 | Pieper |
| 2001/0001234 A1 | 5/2001 | Addy et al. |
| 2001/0012113 A1 | 8/2001 | Yoshizawa et al. |
| 2001/0012127 A1 | 8/2001 | Fukuda et al. |
| 2001/0015821 A1 | 8/2001 | Namizuka et al. |
| 2001/0019429 A1 | 9/2001 | Oteki et al. |
| 2001/0021278 A1 | 9/2001 | Fukuda et al. |
| 2001/0033410 A1 | 10/2001 | Helsel et al. |
| 2001/0050778 A1 | 12/2001 | Fukuda et al. |
| 2001/0054126 A1 | 12/2001 | Fukuda et al. |
| 2002/0012131 A1 | 1/2002 | Oteki et al. |
| 2002/0015111 A1 | 2/2002 | Harada |
| 2002/0018244 A1 | 2/2002 | Namizuka et al. |
| 2002/0027670 A1 | 3/2002 | Takahashi et al. |
| 2002/0033887 A1 | 3/2002 | Hieda et al. |
| 2002/0041383 A1 | 4/2002 | Lewis, Jr. et al. |
| 2002/0044778 A1 | 4/2002 | Suzuki |
| 2002/0054374 A1 | 5/2002 | Inoue et al. |
| 2002/0063802 A1 | 5/2002 | Gullichsen et al. |
| 2002/0105579 A1 | 8/2002 | Levine et al. |
| 2002/0126210 A1 | 9/2002 | Shinohara et al. |
| 2002/0146136 A1 | 10/2002 | Carter, Jr. |
| 2002/0149683 A1 | 10/2002 | Post |
| 2002/0158971 A1 | 10/2002 | Daiku et al. |
| 2002/0167202 A1 | 11/2002 | Pfalzgraf |
| 2002/0167602 A1 | 11/2002 | Nguyen |
| 2002/0191694 A1 | 12/2002 | Ohyama et al. |
| 2002/0196470 A1 | 12/2002 | Kawamoto et al. |
| 2003/0035100 A1 | 2/2003 | Dimsdale et al. |
| 2003/0067461 A1 | 4/2003 | Fletcher et al. |
| 2003/0122825 A1 | 7/2003 | Kawamoto |
| 2003/0142222 A1 | 7/2003 | Hordley |
| 2003/0146975 A1 | 8/2003 | Joung et al. |
| 2003/0169353 A1 | 9/2003 | Keshet et al. |
| 2003/0169918 A1 | 9/2003 | Sogawa |
| 2003/0197701 A1 | 10/2003 | Teodosiadis et al. |
| 2003/0218672 A1 | 11/2003 | Zhang et al. |
| 2003/0222995 A1 | 12/2003 | Kaplinsky et al. |
| 2003/0223007 A1 | 12/2003 | Takane |
| 2004/0001061 A1 | 1/2004 | Stollnitz et al. |
| 2004/0001234 A1 | 1/2004 | Curry et al. |
| 2004/0032516 A1 | 2/2004 | Kakarala |
| 2004/0066970 A1 | 4/2004 | Matsugu |
| 2004/0100588 A1 | 5/2004 | Hartson et al. |
| 2004/0101313 A1 | 5/2004 | Akiyama |
| 2004/0109069 A1 | 6/2004 | Kaplinsky et al. |
| 2004/0189875 A1 | 9/2004 | Zhai et al. |
| 2004/0218071 A1 | 11/2004 | Chauville et al. |
| 2004/0247196 A1 | 12/2004 | Chanas et al. |
| 2005/0007378 A1 | 1/2005 | Grove |
| 2005/0007477 A1 | 1/2005 | Ahiska |
| 2005/0030395 A1 | 2/2005 | Hattori |
| 2005/0046704 A1 | 3/2005 | Kinoshita |
| 2005/0099418 A1 | 5/2005 | Cabral et al. |
| 2005/0175257 A1 | 8/2005 | Kuroki |
| 2005/0185058 A1 | 8/2005 | Sablak |
| 2005/0213128 A1 | 9/2005 | Imai et al. |
| 2005/0238225 A1 | 10/2005 | Jo et al. |
| 2005/0243181 A1 | 11/2005 | Castello et al. |
| 2005/0248671 A1 | 11/2005 | Schweng |
| 2005/0261849 A1 | 11/2005 | Kochi et al. |
| 2005/0286097 A1 | 12/2005 | Hung et al. |
| 2006/0050158 A1 | 3/2006 | Irie |
| 2006/0061658 A1 | 3/2006 | Faulkner et al. |
| 2006/0087509 A1 | 4/2006 | Ebert et al. |
| 2006/0103728 A1* | 5/2006 | Ishigami et al. ............ 348/180 |
| 2006/0119710 A1 | 6/2006 | Ben-Ezra et al. |
| 2006/0133697 A1 | 6/2006 | Uvarov et al. |
| 2006/0176375 A1 | 8/2006 | Hwang et al. |
| 2006/0197664 A1 | 9/2006 | Zhang et al. |
| 2006/0274171 A1 | 12/2006 | Wang |
| 2006/0290794 A1 | 12/2006 | Bergman et al. |
| 2006/0293089 A1 | 12/2006 | Herberger et al. |
| 2007/0091188 A1 | 4/2007 | Chen et al. |
| 2007/0147706 A1 | 6/2007 | Sasaki et al. |
| 2007/0171288 A1 | 7/2007 | Inoue et al. |
| 2007/0236770 A1 | 10/2007 | Doherty et al. |
| 2007/0247532 A1 | 10/2007 | Sasaki |
| 2008/0030587 A1 | 2/2008 | Helbing |
| 2008/0062164 A1 | 3/2008 | Bassi et al. |
| 2008/0231726 A1 | 9/2008 | John |
| 2009/0002517 A1 | 1/2009 | Yokomitsu et al. |
| 2009/0010539 A1 | 1/2009 | Guarnera et al. |
| 2009/0116750 A1 | 5/2009 | Lee et al. |

(56) References Cited

U.S. PATENT DOCUMENTS

| | | | |
|---|---|---|---|
| 2009/0160957 | A1 | 6/2009 | Deng et al. |
| 2009/0257677 | A1 | 10/2009 | Cabral et al. |
| 2010/0048242 | A1* | 2/2010 | Rhoads et al. ............. 455/556.1 |
| 2010/0214436 | A1* | 8/2010 | Kim et al. ................. 348/223.1 |
| 2010/0266201 | A1 | 10/2010 | Cabral et al. |
| 2011/0096190 | A1 | 4/2011 | Silverstein et al. |
| 2011/0225566 | A1 | 9/2011 | Muharsky et al. |
| 2012/0127334 | A1 | 5/2012 | Imai |
| 2013/0083216 | A1 | 4/2013 | Jiang et al. |
| 2013/0212094 | A1* | 8/2013 | Naguib ................ G01C 21/206 707/730 |
| 2013/0294680 | A1 | 11/2013 | Harada et al. |
| 2015/0002692 | A1 | 1/2015 | Cabral et al. |
| 2015/0002693 | A1 | 1/2015 | Cabral et al. |
| 2015/0131902 | A1* | 5/2015 | Arnone ................ G06K 9/4661 382/165 |

FOREIGN PATENT DOCUMENTS

| | | |
|---|---|---|
| EP | 1449169 | 5/2003 |
| EP | 1378790 | 7/2004 |
| EP | 1447977 | 8/2004 |
| EP | 1550980 | 7/2005 |
| GB | 2045026 | 10/1980 |
| GB | 2363018 | 5/2001 |
| JP | 61187467 | 8/1986 |
| JP | 62151978 | 7/1987 |
| JP | 07015631 | 1/1995 |
| JP | 8036640 | 2/1996 |
| JP | 08079622 | 3/1996 |
| JP | 2001052194 | 2/2001 |
| JP | 2002207242 | 7/2002 |
| JP | 2003085542 | 3/2003 |
| JP | 2004221838 | 8/2004 |
| JP | 2005094048 | 4/2005 |
| JP | 2005182785 | 7/2005 |
| JP | 2005520442 | 7/2005 |
| JP | 2006025005 | 1/2006 |
| JP | 2006086822 | 3/2006 |
| JP | 2006094494 | 4/2006 |
| JP | 2006121612 | 5/2006 |
| JP | 2006134157 | 5/2006 |
| JP | 2007019959 | 1/2007 |
| JP | 2007148500 | 6/2007 |
| JP | 2007233833 | 9/2007 |
| JP | 2007282158 | 10/2007 |
| JP | 2008085388 | 4/2008 |
| JP | 2008277926 | 11/2008 |
| JP | 2009021962 | 1/2009 |
| KR | 1020040043156 | 5/2004 |
| KR | 1020060068497 | 6/2006 |
| KR | 1020070004202 | 1/2007 |
| WO | 03043308 | 5/2003 |
| WO | 2004063989 | 7/2004 |
| WO | 2007056459 | 5/2007 |
| WO | 2007093864 | 8/2007 |

OTHER PUBLICATIONS

"Calibration and removal of lateral chromatic abberation in images" Mallon, et al. Science Direct Copyright 2006; 11 pages.

"Method of Color Interpolation in a Singe Sensor Color Camera Using Green Channel Seperation" Weerasighe, et al Visual Information Processing Lab, Motorola Austrailian Research Center pp. IV-3233-IV3236, 2002.

D. Doo, M. Sabin "Behaviour of recrusive division surfaces near extraordinary points"; Sep. 197; Computer Aided Design; vol. 10, pp. 356-360.

D.W.H Doo; "A subdivision algorithm for smoothing down irregular shaped polyhedrons"; 1978; Interactive Techniques in Computer Aided Design; pp. 157-165.

Davis, J., Marschner, S., Garr, M., Levoy, M., Filling holes in complex surfaces using volumetric diffusion, Dec. 2001, Stanford University, pp. 1-9.

Donald D. Spencer, "Illustrated Computer Graphics Dictionary", 1993, Camelot Publishing Company, p. 272.

Duca et al., "A Relational Debugging Engine for Graphics Pipeline, International Conference on Computer Graphics and Interactive Techniques", ACM SIGGRAPH Jul. 2005, pp. 453-463.

E. Catmull, J. Clark, "recursively enerated B-Spline surfaces on arbitrary topological meshes"; Nov. 1978; Computer aided design; vol. 10; pp. 350-355.

gDEBugger, graphicRemedy, http://www.gremedy.com, Aug. 8, 2006, pp. 1-18.

http://en.wikipedia.org/wiki/Bayer_filter; "Bayer Filter"; Wikipedia, the free encyclopedia; pp. 1-4.

http://en.wikipedia.org/wiki/Color_filter_array; "Color Filter Array"; Wikipedia, the free encyclopedia; pp. 1-5.

http://en.wikipedia.org/wiki/Color_space; "Color Space"; Wikipedia, the free encyclopedia; pp. 1-4.

http://en.wikipedia.org/wiki/Color_translation; "Color Management"; Wikipedia, the free encyclopedia; pp. 1-4.

http://en.wikipedia.org/wiki/Demosaicing; "Demosaicing"; Wikipedia, the free encyclopedia; pp. 1-5.

http://en.wikipedia.org/wiki/Half_tone; "Halftone"; Wikipedia, the free encyclopedia; pp. 1-5.

http://en.wikipedia.org/wiki/L*a*b*; "Lab Color Space"; Wikipedia, the free encyclopedia; pp. 1-4.

http://Slashdot.org/articles/07/09/06/1431217.html.

http:englishrussia.com/?p=1377.

J. Bolz, P. Schroder; "rapid evaluation of catmull-clark subdivision surfaces"; Web 3D '02.

J. Stam; "Exact Evaluation of Catmull-clark subdivision surfaces at arbitrary parameter values"; Jul. 1998; Computer Graphics; vol. 32; pp. 395-404.

Keith R. Slavin; Application As Filed entitled "Efficient Method for Reducing Noise and Blur in a Composite Still Image From a Rolling Shutter Camera"; U.S. Appl. No. 12/069,669, Filed Feb. 11, 2008.

Ko et al., "Fast Digital Image Stabilizer Based on Gray-Coded Bit-Plane Matching", IEEE Transactions on Consumer Electronics, vol. 45, No. 3, pp. 598-603, Aug. 1999.

Ko, et al., "Digital Image Stabilizing Algorithms Basd on Bit-Plane Matching", IEEE Transactions on Consumer Electronics, vol. 44, No. 3, pp. 617-622, Aug. 1988.

Krus, M., Bourdot, P., Osorio, A., Guisnel, F., Thibault, G., Adaptive tessellation of connected primitives for interactive walkthroughs in complex industrial virtual environments, Jun. 1999, Proceedings of the Eurographics workshop, pp. 1-10.

Kumar, S., Manocha, D., Interactive display of large scale trimmed NURBS models, 1994, University of North Carolina at Chapel Hill, Technical Report, p. 1-36.

Kuno et al. "New Interpolation Method Using Discriminated Color Correlation For Digital Still Cameras" IEEE Transac. On Consumer Electronics, vol. 45, No. 1, Feb. 1999, pp. 259-267.

Loop, C., DeRose, T., Generalized B-Spline surfaces o arbitrary topology, Aug. 1990, SIGRAPH 90, pp. 347-356.

M. Halstead, M. Kass, T. DeRose; "efficient, fair interolation using catmull-clark surfaces"; Sep. 1993; Computer Graphics and Interactive Techniques, Proc; pp. 35-44.

Morimoto et al., "Fast Electronic Digital Image Stabilization for Off-Road Navigation", Computer Vision Laboratory, Center for Automated Research University of Maryland, Real-Time Imaging, vol. 2, pp. 285-296, 1996.

Paik et al., "An Adaptive Motion Decision system for Digital Image Stabilizer Based on Edge Pattern Matching", IEEE Transactions on Consumer Electronics, vol. 38, No. 3, pp. 607-616, Aug. 1992.

Parhami, Computer Arithmetic, Oxford University Press, Jun. 2000, pp. 413-418.

S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.

S. Erturk, "Real-Time Digital Image Stabilization Using Kalman Filters", http://www,ideallibrary.com, Real-Time Imaging 8, pp. 317-328, 2002.

(56) References Cited

OTHER PUBLICATIONS

T. DeRose, M., Kass, T. Troung; "subdivision surfaces in character animation"; Jul. 1998; Computer Graphics and Interactive Techniques, Proc; pp. 85-94.

Takeuchi, S., Kanai, T., Suzuki, H., Shimada, K., Kimura, F., Subdivision surface fitting with QEM-basd mesh simplificatio and reconstruction of aproximated B-Spline surfaces, 200, Eighth Pacific Conference on computer graphics and applications pp. 202-2012.

Uomori et al., "Automatic Image Stabilizing System by Full-Digital Signal Processing", vol. 36, No. 3, pp. 510-519, Aug. 1990.

Uomori et al., "Electronic Image Stabiliztion System for Video Cameras and VCRS", J. Soc. Motion Pict. Telev. Eng., vol. 101, pp. 66-75, 1992.

* cited by examiner

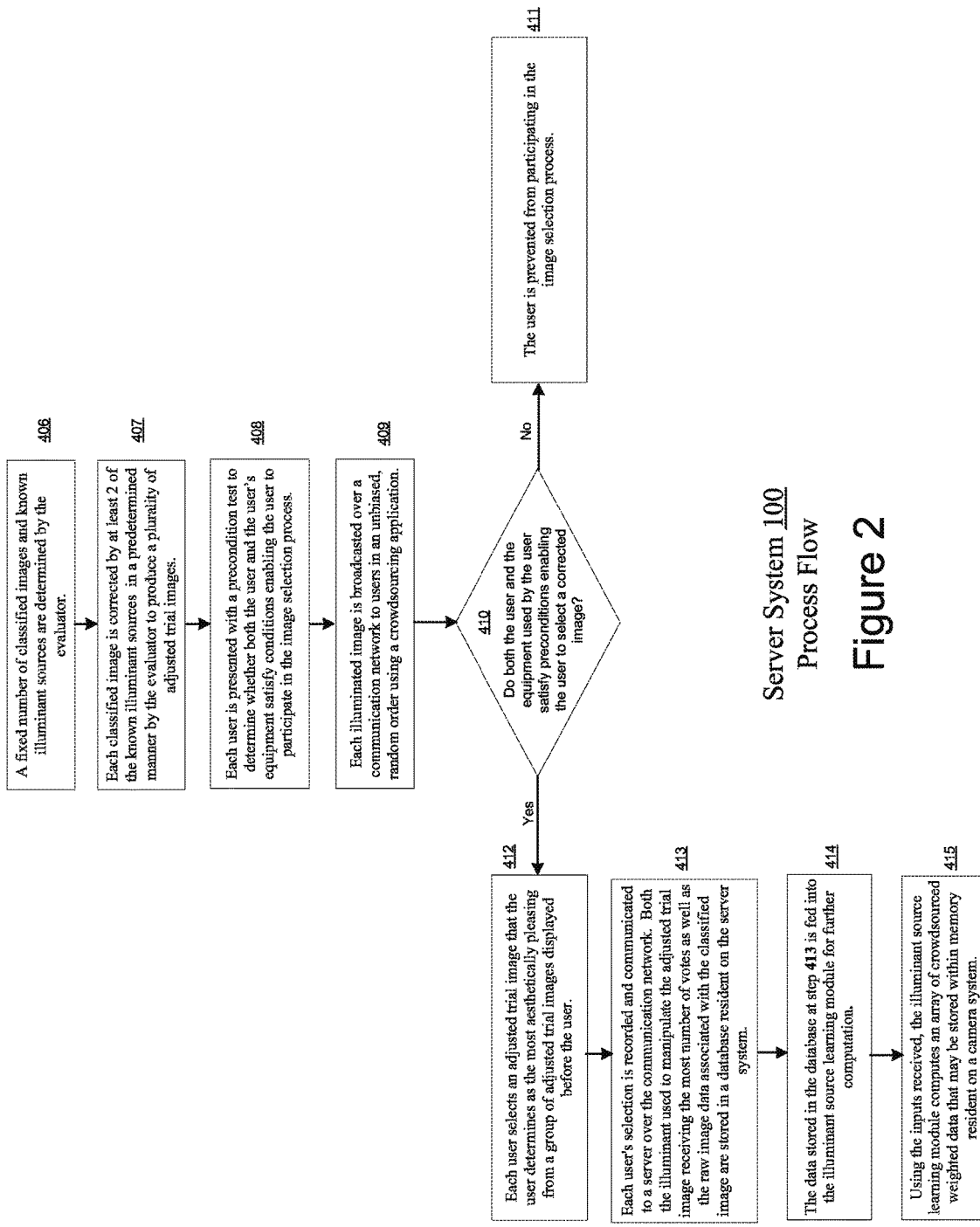

Camera System 200
Process Flow

METHOD AND SYSTEM FOR PERFORMING WHITE BALANCING OPERATIONS ON CAPTURED IMAGES

CROSS-REFERENCE TO RELATED APPLICATIONS

This application is related to patent application: "A METHOD AND SYSTEM FOR GENERATING WEIGHTS FOR USE IN WHITE BALANCING AN IMAGE," concurrently filed with this application, with Ser. No. 13/927,405, which is herein incorporated by reference in its entirety.

FIELD OF THE INVENTION

Embodiments of the present invention are generally related to the field of devices capable of digitally capturing images.

BACKGROUND OF THE INVENTION

Modern digital cameras offer a feature known as "automatic white balancing" which is a process used to adjust the color balance of an image captured by the camera under varying illumination conditions. Conventional white balancing algorithms attempt to attain the same high level of color constancy associated with most human color perception systems by removing unrealistic color casts captured by the camera when acquiring the image. In doing so, these algorithms generally first determine a scene illuminant used to illuminate the captured image. Once determined, the scene illuminant's impact on the captured scene may be neutralized to obtain a more color balanced, aesthetically pleasing image.

Often, in determining the illuminant, conventional white balancing algorithms require a calibration process in which the user must first capture a reference image so that future images captured by the camera may be white balanced. However, these algorithms are often not equipped to handle situations in which the camera may not be able to perform these calibrations. For example, the camera may not have access to scenes with these required reference points and, thus, may produce unappealing resultant images. As a result, the user may have to manually manipulate each image of interest in order to attain a more color balanced image. This process may prove to be especially cumbersome if the user wishes to white balance several images at a time and may lead to user frustration.

SUMMARY OF THE INVENTION

Accordingly, a need exists to address the inefficiencies discussed above. Embodiments of the present invention are operable to perform automatic white balancing operations on images captured by a camera system through the use of weights derived through crowdsourcing procedures. Embodiments of the present invention use crowdsourced weight data resident on the camera system in combination with sampled image data of a captured image to determine a likely illuminant source. When performing automatic white balancing operations on the captured image, embodiments of the present invention may also compute a confidence score which may present the user with a choice to either use the likely illuminant determined using the crowdsourced weights or the camera system's default or normal automatic white balancing correction algorithm Embodiments of the present invention generate a set of images which are illuminated with known and different illuminants. Using crowdsourcing procedures, embodiments of the present invention gather user feedback concerning which images from a group of images adjusted by the known illuminants are considered to be the most aesthetically pleasing. Images selected by the plurality of users may then be stored within a database of selected images.

More specifically, in one embodiment, the present invention is implemented as a method of performing white balancing for a captured image. The method includes sampling image data from the captured image using a camera system producing sampled image data. The method also includes determining a likely illuminant for the captured image using a function of a set of weights residing on the camera system and the sampled image data, in which the set of weights is derived using crowdsourcing procedures.

In one embodiment, the determining process further includes computing a confidence score for the likely illuminant and using a default white balancing correction for the captured image if the confidence score is below a predetermined threshold. In one embodiment, the determining process further includes performing a summation of the set of weights and the sampled image data in combination to determine the likely illuminant.

In one embodiment, the determining process further includes receiving an updated set of weights from a remote server system over a communication network. In one embodiment, the method of receiving further includes transmitting a plurality of newly captured images gathered by the camera system to the remote server system over the communication network for generating the updated set of weights. In one embodiment, the method of receiving further includes transmitting a plurality of user adjusted images captured by the camera system to the remote server system over the communication network for generating the updated set of weights.

In one embodiment the set of weights is derived from subjective user input gathered from a plurality of users concerning a plurality of different illuminants applied to a plurality of classified images. Additionally, the method also includes computing a white balance correction for the captured image using the likely illuminant. In one embodiment, the method of computing a confidence score further includes prompting a user to select either the default illuminant white balancing correction or the likely illuminant after the confidence score is calculated.

In one embodiment, the present invention is implemented as a system selecting a likely illuminant for white balancing a captured image. The system includes a sampling module of a camera system, in which the sampling module is operable to sample image data from the captured image producing sampled image data. Also, the system includes a determination module operable to determine a likely illuminant using a function of a set of weights residing on the camera system and the sampled image data, in which the set of weights is derived using crowdsourcing procedures. In one embodiment, the determination module is further operable to perform a summation of the set of weights and the sampled image data in combination to determine the likely illuminant.

In one embodiment, the determination module is further operable to receive an updated set of weights from the remote server system over a communication network. In one embodiment, the determination module is operable to transmit a plurality of captured images gathered by the camera system to the remote server system over the communication network for generating the updated set of weights. In one embodiment, the determination module is operable to transmit a plurality of user adjusted images captured by the camera system to the remote server system over the communication network for generating the updated set of weights. In one embodiment, the set of weights is derived from subjective user input gathered from a plurality of users concerning a plurality of different illuminants applied to a plurality of classified images.

Also, the system includes a confidence calculation module operable to compute a confidence score for the likely illuminant, in which the camera system is operable to use a default white balancing procedure if the confidence score is below a predetermined threshold. Also, the system includes a white balance computation module operable to compute a white balance correction data for the captured image using the likely illuminant provided the confidence score is above the threshold. In one embodiment, the confidence calculation module is further operable to prompt a user to select either the default white balancing procedure or the likely illuminant after the confidence score is calculated. Furthermore, the system includes a communication module operable to communicate data between a remote server and the camera system.

In one embodiment, the present invention is implemented as a method of selecting a likely illuminant for white balancing a captured image. The method includes generating sampled image data values from a captured image. The method includes determining a likely illuminant of the captured image using a function of a set of weights resident on the camera system and the sampled image data values, in which the set of weights is derived using crowdsourcing algorithms.

In one embodiment, the determining process further includes performing a summation of the set of weights and the sampled image data in combination to determine the likely illuminant. In one embodiment, the determining process further includes receiving an updated set of weights from a remote server system over a communication network. In one embodiment, the receiving process further includes transmitting a plurality of user adjusted images captured by the camera system to the remote server system over the communication network for generating the updated set of weights.

In one embodiment, the set of weights is derived from subjective user input gathered from a plurality of users concerning a plurality of different illuminants applied to a plurality of classified images. The method also includes computing a confidence score for the likely illuminant. Furthermore, the method also includes computing a white balance correction for the captured image using the likely illuminant provided the confidence score is above a predetermined threshold. The method further includes using a default white balancing procedure to correct the captured image provided the confidence score is below said predetermined threshold.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 2 depicts a flowchart of an exemplary server system process for determining a set of weights derived from crowdsourced data for use in white balancing an image in accordance with various embodiments of the present invention.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follow are presented and discussed in terms of a process. Although operations and sequencing thereof are disclosed in a figure herein (e.g., FIGS. 2 and 4) describing the operations of this process, such operations and sequencing are exemplary. Embodiments are well suited to performing various other operations or variations of the operations recited in the flowchart of the figure herein, and in a sequence other than that depicted and described herein.

As used in this application the terms controller, module, system, and the like are intended to refer to a computer-related entity, specifically, either hardware, firmware, a combination of hardware and software, software, or software in execution. For example, a module can be, but is not limited to being, a process running on a processor, an integrated circuit, an object, an executable, a thread of execution, a program, and or a computer. By way of illustration, both an application running on a computing device and the computing device can be a module. One or more modules can reside within a process and/or thread of execution, and a component can be localized on one computer and/or distributed between two or more computers. In addition, these modules can be executed from various computer readable media having various data structures stored thereon.

Exemplary Method for Generating Weights

Figure 1A:
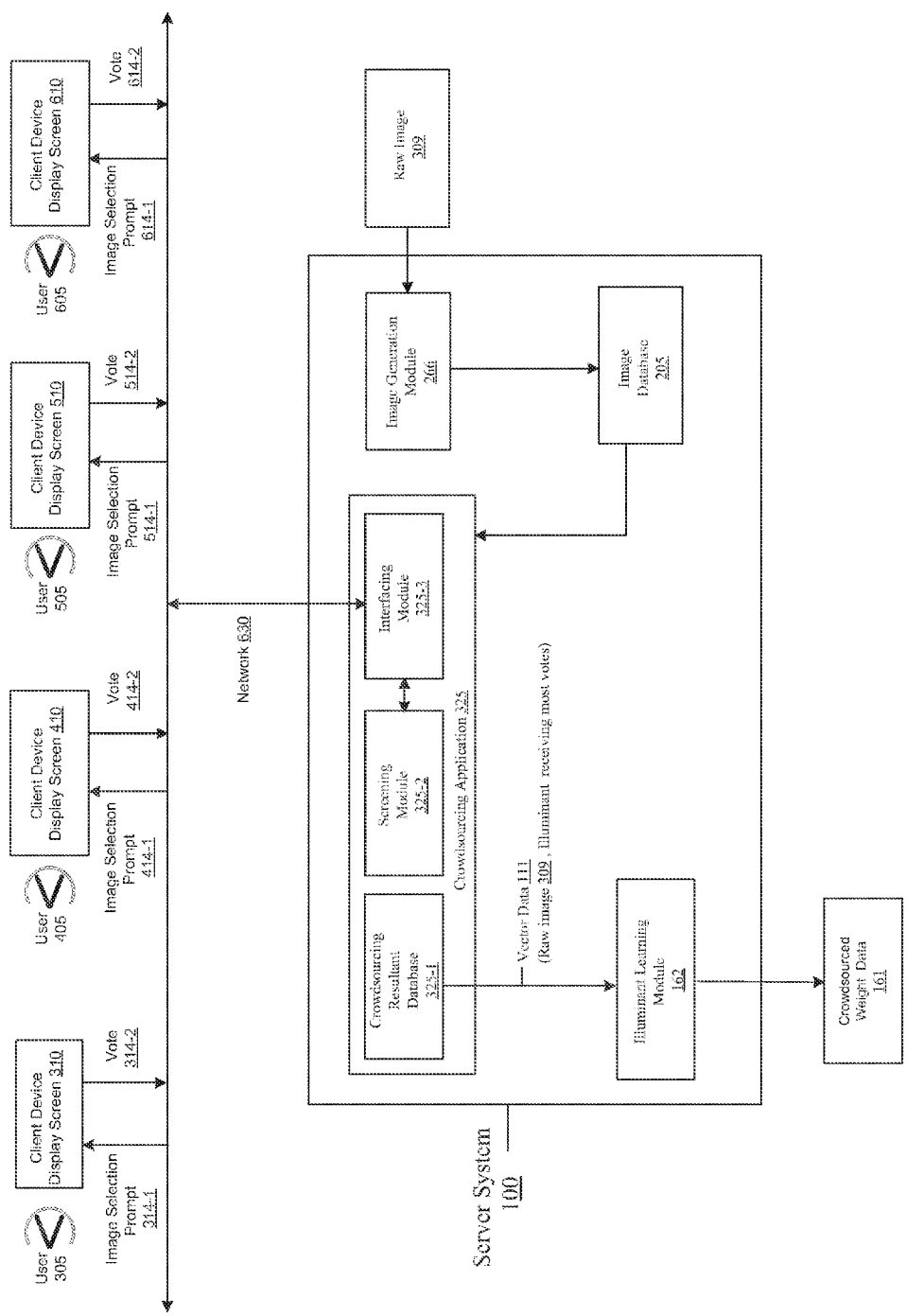
FIG. 1A is a block diagram of an exemplary server system capable of generating a set of weights for use in white balancing an image in accordance with the present invention.

As presented in FIG. 1A, an exemplary server system is depicted in accordance with embodiments of the present invention. FIG. 1A depicts server system 100 which may be implemented as a remote server, personal computer, laptop or the like. Network 630 may be a wireless network, a wired network, or a combination thereof.

According to one embodiment, raw image 309 may be an image used by server system 100 for purposes of generating an image set for use as training data to train illuminant learning module 162. These images may be used by illuminant learning module 162 for purposes of mapping potential scene illuminant sources to scenes captured by a camera device. These images may be captured using any digital device capable of capturing an image such as a digital camera, mobile phone, tablet or the like.

Figure 1B:
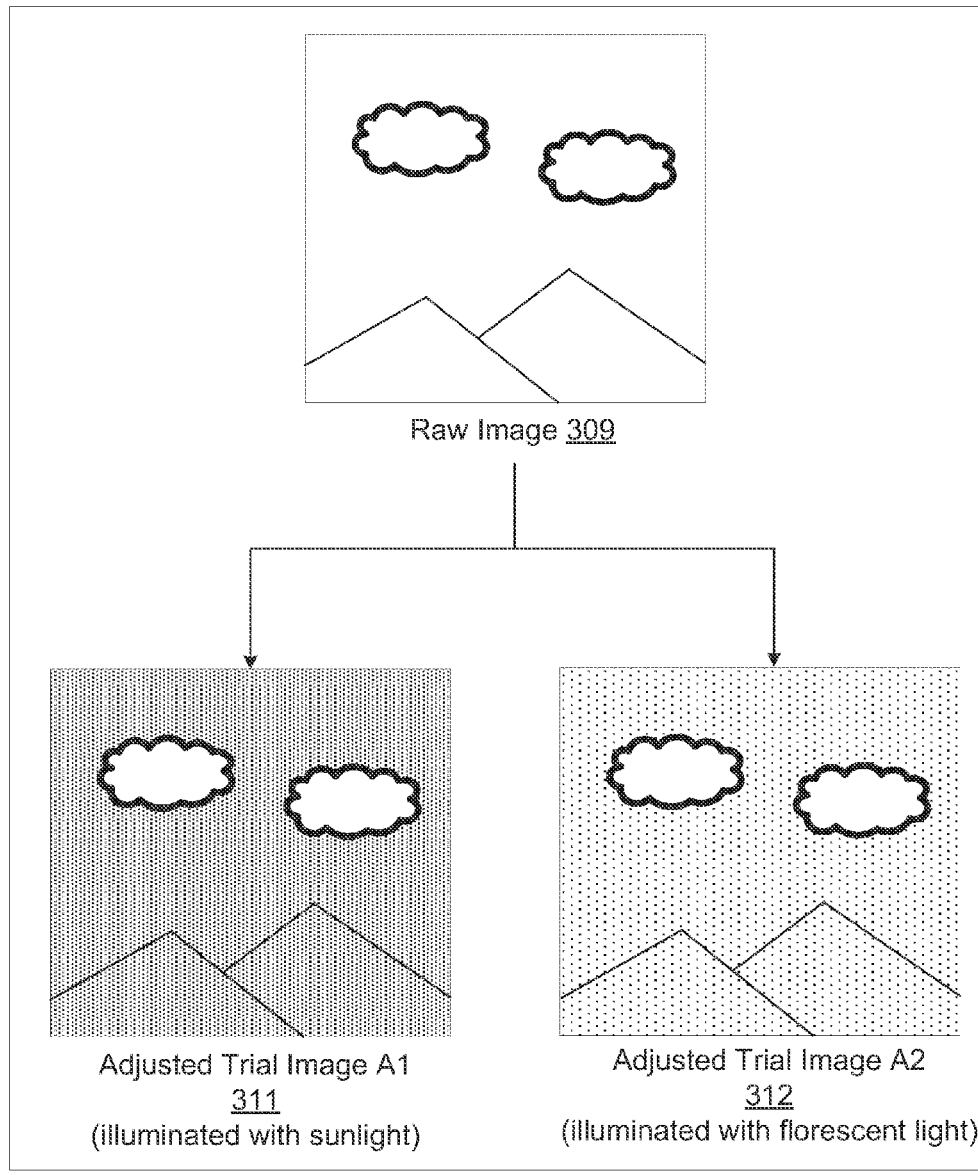
FIG. 1B provides an illustration of an exemplary trial image generation process in accordance to embodiments of the present invention.

With reference to FIG. 1B, once raw image 309 is received, image generation module 266 may proceed to generate a predetermined number of images using raw image 309 as a reference image. Furthermore, these generated images ("trial images") may then be adjusted by image generation module 266 using different classified illuminant sources (e.g., sunlight, florescent light, tungsten light) to produce adjusted trial images for use in gathering crowdsourced data.

The adjustment process may involve manipulating the color channel values (e.g., RGB values) of the pixels of a trial image generated using predetermined color intensity values associated with a classified illuminant source. For example, image generation module 266 may be configured to use values associated with sunlight to adjust the color channel values of the pixels comprising trial image A1 ("adjusted trial image A1" 311). Similarly, image generation module 266 may use values associated with florescent light to adjust the color channel values of pixels comprising trial image A2 ("adjusted trial image A2" 312).

With further reference to FIG. 1A, these adjusted trial images may be stored within image database 205 and available for use by crowdsourcing application 325 to gather user feedback regarding a preferred illuminant source. Additionally, image database 205 may also be used to store raw image data associated with each adjusted trial image for further processing by illuminant learning module 162. As illustrated by FIG. 1A, crowdsourcing application 325 may be an application residing on server system 100 that is capable of outsourcing tasks to a plurality of users (e.g., users 305, 405, 505, and 605) over a communication network (e.g., network 630) using well-known crowdsourcing algorithms.

In one embodiment, crowdsourcing application 325 may be an application (e.g., web based) that engages users (via interfacing module 325-3) to participate in surveys to determine which adjusted image the user believes to be the most aesthetically pleasing. User participation may be encouraged through monetary remuneration (e.g., micropayments) or other forms of incentives. Users may interact with crowdsourcing application 325 using a web browser installed locally on the user's personal computer, laptop, mobile device or the like. In one embodiment, crowdsourcing application 325 may be an application that engages user participation through texting technology (e.g., MMS technology) in which user feedback is collected in response to picture messages sent to the user.

Furthermore, to maintain the integrity of the data collected from the group of users, crowdsourcing application 325 may apply user preconditioning techniques using screening module 325-2. Screening module 325-2 may perform various tests on users prior to their participation in the survey. For instance, color blindness tests may be used to determine the participating user's color detection competency in distinguishing adjusted images displayed before the user. Also, user veracity tests may be used to determine a user's truthfulness with regards to answering questions posed to the user. Furthermore, equipment functionality tests may be used to determine whether the crowdsourcing application can interact with the user and detect selections made by the user (e.g., display screen functionality tests).

Figure 1C:
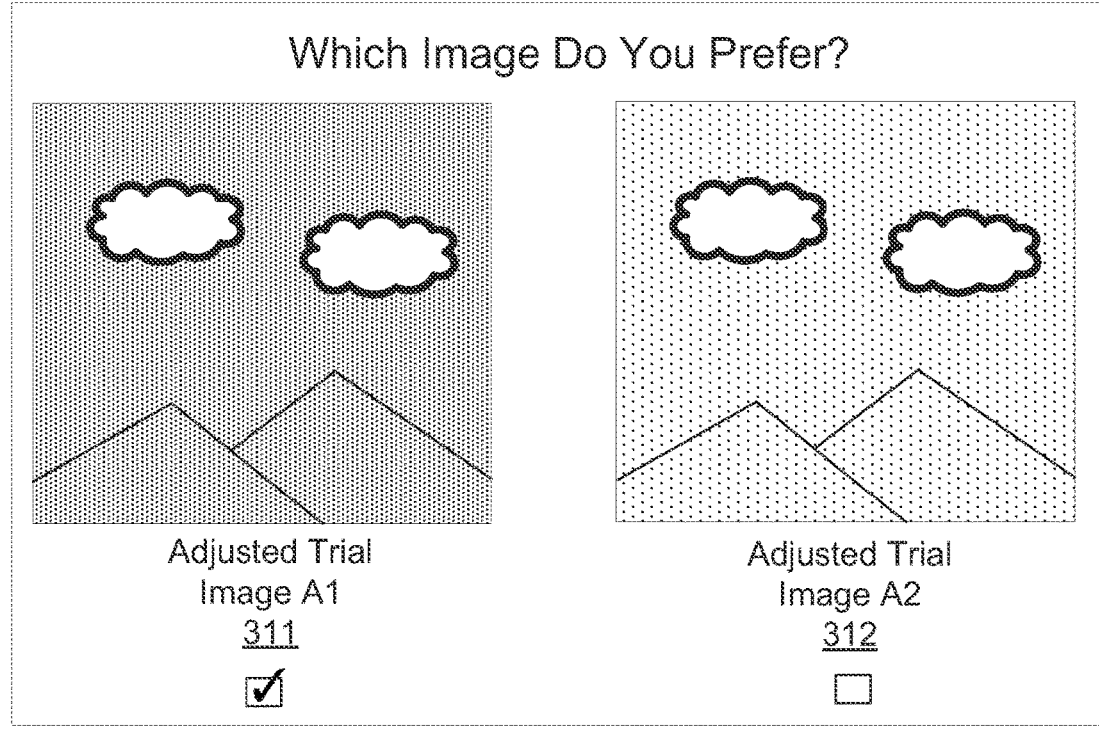
FIG. 1C provides an illustration of an exemplary display screen prompt used to determine a likely illuminant through crowdsourcing in accordance to embodiments of the present invention.

As illustrated in the embodiment depicted in FIG. 1A, crowdsourcing application 325 may gather user feedback through a voting process in which users may express their preference towards a particular illuminant source for use within certain scenes. Upon successful completion of the screening process, each participating user may then be prompted to select the adjusted trial image that the user considers to be the most aesthetically pleasing (as depicted by the exemplary image selection prompt of FIG. 1C). The adjusted trial images may be displayed to the user in a random order such that the user is not biased in any manner when deciding on which image to vote for. Furthermore, users may also be ignorant of the manner in which images were adjusted, thus, providing a greater degree of protection against biasing the user. For example, with further reference to FIG. 1C, users may be given no indication that adjusted trial image A1 311 was adjusted using sunlight and that adjusted trial image A2 312 was adjusted using florescent light.

In one embodiment, the user may express feedback through placement of a mark next to the adjusted image (e.g., checkmark placed within a radio field). According to one embodiment, users using touchscreen display screens may touch the image displayed to express a preference towards a particular adjusted trial image. In another embodiment, the user may provide feedback by ranking the adjusted trial images displayed. For instance, images rated as the most aesthetically pleasing may receive a higher rank than images deemed less aesthetically pleasing.

Figure 1D:
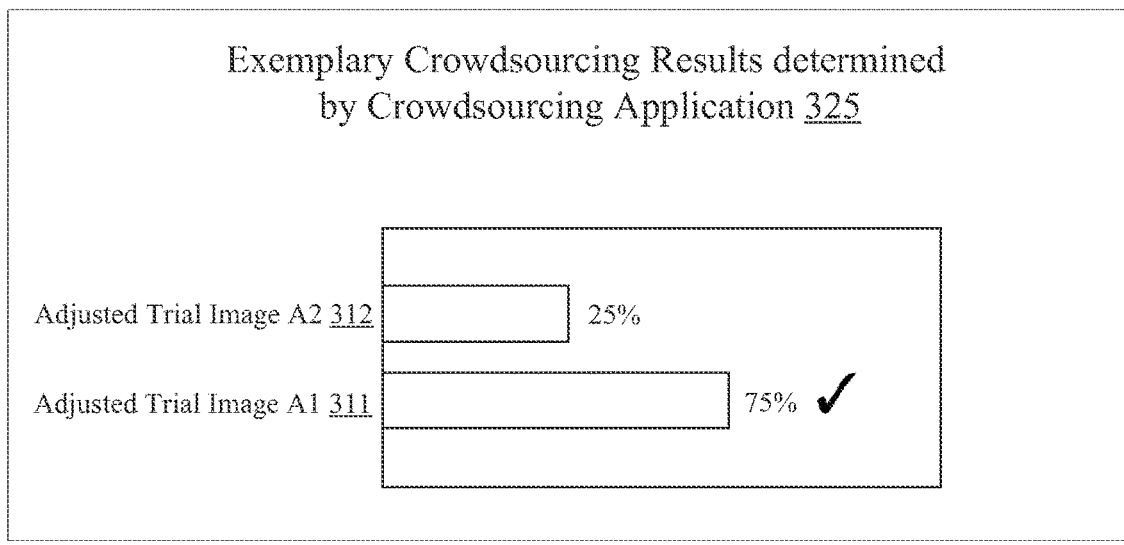
FIG. 1D provides an illustration of exemplary crowdsourcing results used to determine a set of weights for use in white balancing an image in accordance to embodiments of the present invention.

With further reference to FIG. 1A, server system 100 may to store feedback provided by users within crowdsourcing resultant database 325-1. According to one embodiment, crowdsourcing resultant database 325-1 may store data associated with the adjusted trial image receiving the most number of votes, as determined by crowdsourcing application 325 (e.g., adjusted trial image A1 311 in FIG. 1D). Also, user feedback may be stored as an array of vector data (e.g., vector data 111 of FIG. 1A) within crowdsourcing resultant database 325-1. Vector data may include the raw image data associated with the image (e.g., data values associated with raw image 309) as well as the values associated with the illuminant used to adjust the trial image receiving the most number of votes from users participating in the survey (e.g., sunlight illuminant values used to manipulate adjusted trial image A1 311).

Embodiments of the present invention may also include the functionality to use machine learning to explicitly encode scene illuminants determined through crowdsourcing procedures. According to one embodiment, vector data 111 may be fed into illuminant learning module 162 which may use the vector data received to generate a weight function that produces weight values (e.g., crowdsourced weight data 161) for use in white balancing newly captured images. In this manner, crowdsourced weight data 161 may be explicitly encoded scene information used by camera devices for selecting a proper illuminant when performing white balancing operations. For instance, crowdsourced weight data 161 may be explicitly encoded information used by a camera device to classify bright scenes, where blue is a predominant scene color, as an "outside" scene in which sunlight is determined to be the scene illuminant. When generating crowdsourced weight data 161, illuminant learning module 162 may access raw image data associated with vector data from image database 205. Illuminant learning module 162 may use well-known machine learning algorithms (e.g., support vector machines, neural networks, decision trees) when computing crowdsourced weight data 161.

Furthermore, embodiments of the present invention may be configured to use scenes and processes constructed for purposes of maximizing the learning potential of illuminant learning module 162. As such, embodiments of the present invention may utilize a more sophisticated knowledge base when encoding scene illuminant determinations as a priori data (e.g., crowdsourced weight data 161) loaded onto a camera device. For instance, in one embodiment, vector data 111 may be fed to illuminant learning module 162 in a random order to maximize the ability of illuminant learning module 162 to learn the content of the raw images and, thus, minimize any learning bias. In one embodiment, the technique of randomization may include randomizing the orientation of the image associated with vector data 111 as it is being fed into illuminant learning module 162. In another embodiment, the raw image data itself may also be randomized in a manner such that color combinations included within the image data may be de-correlated prior to being fed into illuminant learning module 162. Furthermore, crowdsourced weight data 161 may be loaded and stored within a camera device in-factory during production of the camera device. Also, in response to receiving new image data post-production, illuminant learning module 162 may also be able to generate an updated set of crowdsourced weight data 161 that may be downloadable from server system 100 for use in a camera device during a synchronization process between the server system and the camera device. These synchronizations may take place during predetermined intervals or upon the user's request for synchronization.

FIG. 2 presents flow chart that provides an exemplary server process for determining a set of weights for use in white balancing an image in accordance with various embodiments of the present invention.

At step 406, a fixed number of raw images and known illuminant sources are determined by the evaluator.

At step 407, each raw image is corrected by at least 2 of the known illuminant sources in a predetermined manner by the evaluator to produce a plurality of adjusted trial images.

At step 408, each user is presented with a precondition test to determine whether both the user and the user's equipment satisfy conditions enabling the user to participate in the image selection process.

At step 409, each illuminated image is broadcasted over a communication network to users in an unbiased, random order using a crowdsourcing application.

At step 410, a determination is made as to whether both the user and the equipment used by the user satisfy preconditions enabling the user to select a corrected image. If both the user and the equipment used by the user do not satisfy the preconditions, then the user is prevented from participating in the survey, as detailed in step 411. If both the user and the equipment used by the user do satisfy the preconditions, then each user selects an adjusted trial image that the user determines as the most aesthetically pleasing from a group of adjusted trial images displayed before the user, as detailed in step 412.

At step 411, both the user and the equipment used by the user have been determined to not satisfy the preconditions and, therefore, the user is prevented from participating in the survey.

At step 412, both the user and the equipment used by the user have been determined to satisfy the preconditions and, therefore, each user selects an adjusted trial image that the user determines as the most aesthetically pleasing from a group of adjusted trial images displayed before the user.

At step 413, each user's selection is recorded and communicated to a server over the communication network. Both the illuminant used to manipulate the adjusted trial image receiving the most number of votes as well as the image data associated with the raw image are stored in a database resident on the server system.

At step 414, the data stored in the database at step 413 is fed into the illuminant source learning module for further computation.

At step 415, using the inputs received, the illuminant source learning module computes an array of crowdsourced weight data that may be stored within memory resident on a camera system.

Exemplary Method for White Balancing an Image

Figure 3:
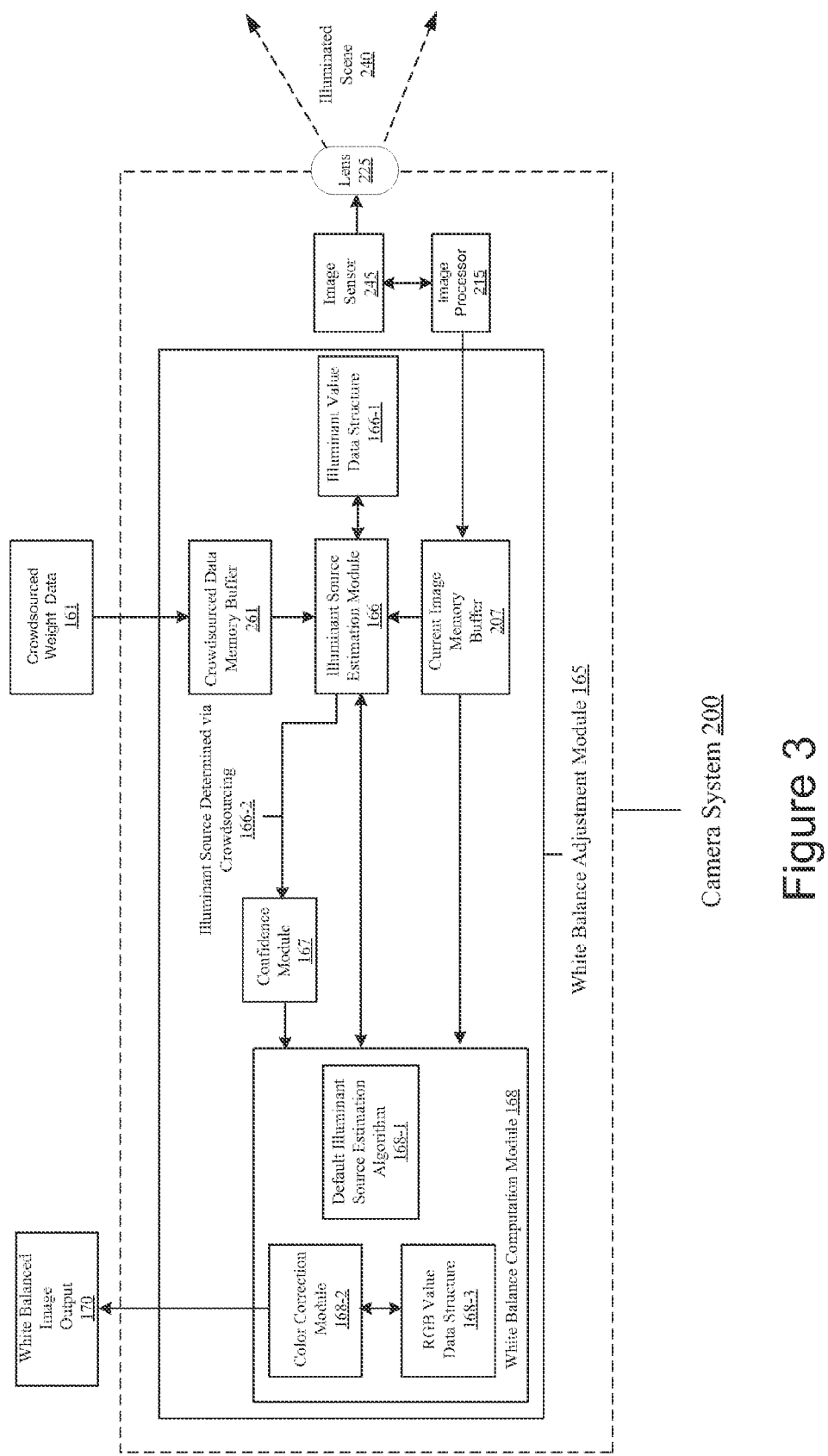
FIG. 3 is a block diagram of an exemplary camera system capable of using a set of weights derived from crowdsourced data for use in white balancing an image in accordance to embodiments of the present invention.

With reference to FIG. 3, white balance adjustment module 165 may be operable to perform white balancing operations on images captured by camera system 200. White balance adjustment module 165 may be stored and executed within memory resident on camera system 200. Camera system 200 may be any device capable of capturing an image such as a digital camera, mobile phone, tablet or the like. In a manner similar to raw image generation module 266 of server system 100, images captured by camera system 200 may be sampled using well known techniques used within the field of image processing (e.g., weighted area sampling, point sampling, Bayer pattern) using image sensor 245 and image processor 215. Illuminated scene 240 represents the color space of a scene illuminated by unknown illuminant sources.

Camera system 200 may capture illuminated scene 240 through lens 225, which may be coupled to image sensor 245. According to one embodiment, image sensor 245 may comprise an array of pixel sensors that are each capable of acquiring color channel data from illuminated scene 240. Each pixel sensor of image sensor 245 may be configured to capture a specific color intensity that is emitted from the color space of illuminated scene 240 (e.g., RGB values). Furthermore, the color channel data captured from illuminated scene 240 may be stored in current image memory buffer 207 for further processing by components of camera system 200.

Illuminant source estimation module 166 may determine a likely illuminant using the sampled image data stored within current image memory buffer 207 and the crowdsourced weight data 161 stored within crowdsourced data memory buffer 261. As discussed supra, the loading of crowdsourced weight data 161 on to camera system 200 may occur in-factory during the manufacture of camera system 200. Camera system 200 may also be operable to receive an updated set of crowdsourced weights through periodic synchronizations between camera system 200 and server system 100 over a communication network. In one embodiment, an updated set of weights may be generated (e.g., through illuminant learning module 162 of server system 100) in response to newly captured images taken by camera system 200. For instance, camera system 200 may accumulate a set of images which may then be subsequently uploaded to server system 100 during a synchronization period. Once uploaded, illuminant learning module 162 may learn the content of these newly captured images using the learning algorithms described herein. Upon completion of the learning phase, illuminant learning module 162 may proceed to compute an updated set of weights. This updated set of weights may then be available for download during the next synchronization period between camera system 200 and server system 100.

Furthermore, in a similar manner, adjustments made to the newly captured images taken by camera system 200 may also be used in generating an updated set of weights. For instance, using either camera system 200 or photo editing software independent of camera system 200, a user may adjust a set of images which may then be subsequently uploaded to server system 100 during a synchronization period. Once uploaded, illuminant learning module 162 may then learn the content of the user adjusted set of images. Upon completion of the learning phase, illuminant learning module 162 may then proceed to compute an updated set of weights, which may be available for download during the next synchronization period between camera system 200 and server system 100.

According to one embodiment, illuminant source estimation module 166 may determine a likely illuminant source based on a summation of the sampled image data and the crowdsourced weight data 161. This summation process may be expressed by the following formula:

$$\Sigma_{n=1}^{m} W_n I_n$$

in which illuminant source estimation module 166 may sum each weight W from crowdsourced weight data 161 in combination with the sampled image data I (e.g., pixel coordinate values) of the image capturing illuminated scene 240. Furthermore, the number of weights m may be determined by illuminant learning module 162.

Using the results of the summation process, illuminant source estimation module 166 may then proceed to compare the weighted sampled data of the image capturing illuminated scene 240 to a corresponding set of values associated with likely illuminant sources stored within illuminant value data structure 166-1. According to one embodiment of the present invention, the weighted sampled data of the image capturing illuminated scene 240 used for the comparison may consist of a group of pixel coordinates, with each pixel coordinate having a set of RGB values. The RGB values of this group may be compared to the RGB values of a corresponding group of pixel coordinates stored within illuminant value data structure 166-1 belonging to a particular illuminant source. According to one embodiment, if the RGB values of the weighted sampled data are within a RGB value threshold of a particular illuminant, illuminant source estimation module 166 may determine that illuminant to be the likely illuminant. Embodiments of the present invention are not limited by the manner in which these groups of pixel coordinates are selected nor by the method of calculating the RGB values (e.g., averaging the RGB values) for the selected group. Furthermore, pixel coordinate values of the likely illuminant sources stored within illuminant value data structure 166-1 may be predetermined.

With further reference to FIG. 3, white balance computation module 168 may receive the likely illuminant source determined by illuminant source estimation module 166 as well as the sampled image data from current image memory buffer 207. Furthermore, white balance computation module 168 may also receive a confidence score from confidence module 167 which may be used to measure the reliability of the illuminant source determination made by illuminant source estimation module 166. According to one embodiment, higher confidence scores may be assigned to determinations made by illuminant source estimation module 166 if the weighted sampled data associated with illuminated scene 240 closely correlates with the values associated with an illuminant stored within illuminant value data structure 166-1. In contrast, lower confidence scores may be assigned to the determinations made by illuminant source estimation module 166 if the weighted sampled data associated with illuminated scene 240 does not closely correlate with the values associated with an illuminant stored within illuminant value data structure 166-1.

Using the confidence score that is calculated, white balance computation module 168 may then compare the score to a predetermined confidence score threshold. According to one embodiment, based on this comparison, a determination may be made as to which illuminant source estimation algorithm camera system 200 will use for performing automatic white balancing operations on the image capturing illuminated scene 240. Color correction module 168-2 may adjust the RGB values of the image capturing illuminated scene 240 based on the results of the comparison.

For instance, if the confidence score is within the predetermined confidence score threshold, white balance computation module 168 may use the illuminant source determined by illuminant source estimation module 166 using crowdsourced weight data 161. Accordingly, color correction module 168-2 may read the RGB values associated with the illuminant source determined when adjusting the RGB values of the image capturing illuminated scene 240. However, if the confidence score is below the predetermined confidence score threshold, white balance computation module 168 may be configured to use default automatic white balancing operations local to camera system 200. In this instance, illuminant source estimation module 166 may use default illuminant source estimation algorithm 168-1 when determining a likely illuminant. Accordingly, color correction module 168-2 may then proceed to read the RGB values associated with the illuminant source determined using this algorithm when adjusting the RGB values of the image capturing illuminated scene 240.

Figure 4:
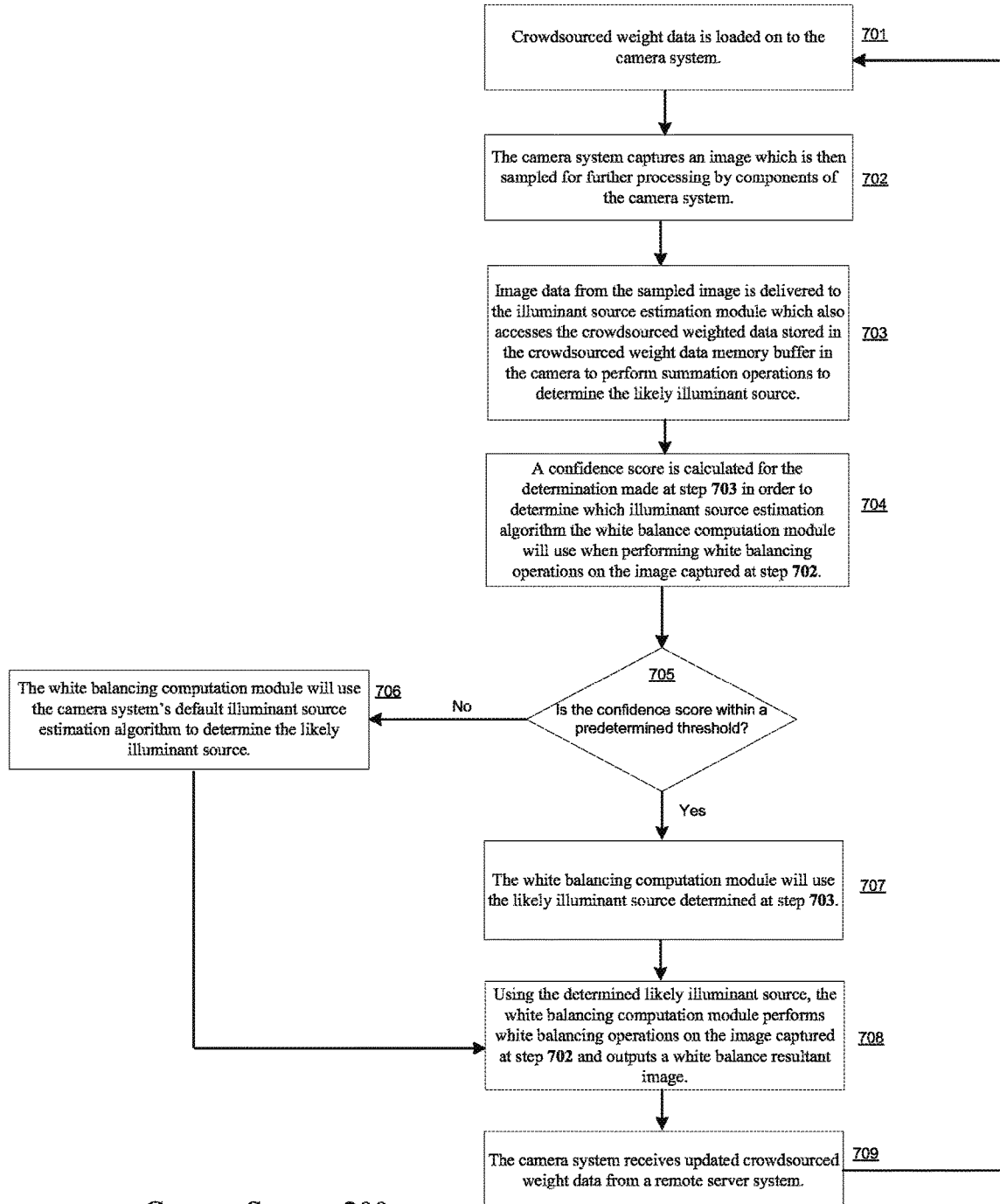
FIG. 4 depicts a flowchart of an exemplary camera system process for performing white balancing operations using crowdsourced weights in accordance with various embodiments of the present invention.

FIG. 4 presents a flowchart of an exemplary camera system process for performing white balancing operations using crowdsourced weights in accordance with various embodiments of the present invention.

At step 701, crowdsourced weight data is loaded on to the camera system.

At step 702, the camera system captures an image which is then sampled for further processing by components of the camera system.

At step 703, image data from the sampled image is delivered to the illuminant source estimation module which also accesses the crowdsourced weighted data stored in the crowdsourced weight data memory buffer in the camera to perform summation operations to determine the likely illuminant source.

At step 704, a confidence score is calculated for the determination made at step 703 in order to determine which illuminant source estimation algorithm the white balance computation module will use when performing white balancing operations on the image captured at step 702.

At step 705, a determination is made as to whether the confidence score calculated at step 704 is within a predetermined threshold. If the score is not within the predetermined threshold, then the white balance computation module will use the camera system's default illuminant source estimation algorithm to determine the likely illuminant source, as detailed in step 706. If the score is within the predetermined threshold, then the white balance computation module will use the likely illuminant source determined at step 703, as detailed in step 707.

At step 706, the score is determined to not be within the predetermined threshold and, therefore, the white balancing computation module will use the camera system's default illuminant source estimation algorithm to determine the likely illuminant source.

At step 707, the score is determined to be within the predetermined threshold and, therefore, the white balancing computation module will use the likely illuminant source determined at step 703.

At step 708, using the determined likely illuminant source, the white balancing computation module performs white balancing operations on the image captured at step 702 and outputs a white balance resultant image.

At step 709, the camera system receives updated crowd-sourced weight data from a remote server system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above disclosure. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method of performing white balancing for a captured image, said method comprising:
sampling image data from said captured image using a camera system producing sampled image data;
determining a likely illuminant for said captured image using a function of a set of weights resident on said camera system and said sampled image data, wherein said set of weights is derived using crowdsourcing procedures, wherein said determining said likely illuminant comprises calculating and using a summation of each weight of said set of weights combined with image data comprising coordinates and associated color data related to said sampled image data; and
computing a white balance correction for said captured image using said likely illuminant.

2. The method of performing white balancing as described in claim 1, wherein said determining further comprises computing a confidence score for said likely illuminant and using a default white balancing correction for said captured image if said confidence score is below a predetermined threshold.

3. The method of performing white balancing as described in claim 2, wherein said computing a confidence score further comprises prompting a user to select either said default illuminant white balancing correction or said likely illuminant after said confidence score is calculated.

4. The method of performing white balancing as described in claim 1, wherein said determining further comprises receiving an updated set of weights from a remote server system over a communication network.

5. The method of performing white balancing as described in claim 4, wherein said receiving further comprises transmitting a plurality of newly captured images gathered by said camera system to said remote server system over said communication network for generating said updated set of weights.

6. The method of performing white balancing as described in claim 4, wherein said receiving further comprises transmitting a plurality of user adjusted images captured by said camera system to said remote server system over said communication network for generating said updated set of weights.

7. The method of performing white balancing as described in claim 1, wherein said set of weights is derived from subjective user input gathered from a plurality of users concerning a plurality of different illuminants applied to a plurality of classified images.

8. The method of performing white balancing as described in claim 7, wherein said subjective user input comprises user selections of a most aesthetically pleasing trial image of a plurality of trial images each of different illumination sources.

9. The method of selecting a likely illuminant as described in claim 1, wherein said summation comprises a grouping of pixel coordinates and corresponding color values associated therewith and wherein further said determining a likely illuminant for said captured image further comprises comparing said grouping against a plurality of groupings of coordinates and associated color values stored in a data structure, wherein respective groupings of said data structure correspond to respective illuminant sources.

10. A system for selecting a likely illuminant for white balancing a captured image, said system comprising:
 a sampling module of a camera system, wherein said sampling module is operable to sample image data from said captured image producing sampled image data;
 a determination module operable to determine a likely illuminant using a function of a set of weights resident on said camera system and said sampled image data, wherein said set of weights is derived using crowd-sourcing procedures, wherein said likely illuminant is determined based on a summation of each weight of said set of weights combined with image data comprising coordinates and associated color data related to said sampled image data;
 a confidence calculation module operable to compute a confidence score for said likely illuminant, wherein said camera system is operable to use a default white balancing procedure if said confidence score is below a predetermined threshold;
 a white balance computation module operable to compute a white balance correction data for said captured image using said likely illuminant provided said confidence score is above said threshold; and
 a communication module operable to communicate data between a remote server and said camera system.

11. The system for selecting a likely illuminant as described in claim 10, wherein said confidence calculation module is further operable to prompt a user to select either said default white balancing procedure or said likely illuminant after said confidence score is calculated.

12. The system for selecting a likely illuminant as described in claim 10, wherein said determination module is further operable to receive an updated set of weights from said remote server system over a communication network.

13. The system for selecting a likely illuminant as described in claim 12, wherein said determination module is operable to transmit a plurality of captured images gathered by said camera system to said remote server system over said communication network for generating said updated set of weights.

14. The system for selecting a likely illuminant as described in claim 12, wherein said determination module is operable to transmit a plurality of user adjusted images captured by said camera system to said remote server system over said communication network for generating said updated set of weights.

15. The system for selecting a likely illuminant as described in claim 12, wherein said set of weights is derived from subjective user input gathered from a plurality of users concerning a plurality of different illuminants applied to a plurality of classified images.

16. The system for selecting a likely illuminant as described in claim 15, wherein said subjective user input comprises user selections of a most aesthetically pleasing trial image of a plurality of trial images each of different illumination sources.

17. The system for selecting a likely illuminant as described in claim 10, wherein said summation comprises a first group of pixel coordinates and corresponding color values associated therewith and wherein further said determination module is configured to determine a likely illuminant for said captured image by comparing said first group against a second group of pixel coordinates and corresponding color values associated therewith stored in a data structure, wherein said data structure stores a plurality of different groupings of pixel coordinates and corresponding color values associated with different illuminant sources.

18. A method of selecting a likely illuminant for white balancing a captured image, said method comprising:
 generating sampled image data values from a captured image;
 determining a likely illuminant of said captured image using a function of a set of weights resident on said camera system and said sampled image data values, wherein said set of weights is derived using crowd-sourcing algorithms, wherein said determining said likely illuminant comprises calculating and using a summation of each weight of said set of weights combined with image data comprising coordinates and associated color data related to said sampled image data;
 computing a confidence score for said likely illuminant, and computing a white balance correction for said captured image using said likely illuminant provided said confidence score is above a predetermined threshold.

19. The method of selecting a likely illuminant as described in claim 18, wherein said determining further comprises receiving an updated set of weights from a remote server system over a communication network.

20. The method of selecting a likely illuminant as described in claim 19, wherein said receiving further comprises transmitting a plurality of user adjusted images captured by said camera system to said remote server system over said communication network for generating said updated set of weights.

21. The method of selecting a likely illuminant as described in claim 19, wherein said set of weights is derived from subjective user input gathered from a plurality of users concerning a plurality of different illuminants applied to a plurality of classified images.

22. The method of selecting a likely illuminant as described in claim 21, wherein said subjective user input comprises user selections of a most aesthetically pleasing trial image of a plurality of trial images each of different illumination sources.

23. The method of selecting a likely illuminant as described in claim 18 further comprising using a default white balancing procedure to correct said captured image provided said confidence score is below said predetermined threshold.

24. The method of selecting a likely illuminant as described in claim 18, wherein said summation comprises a first group of pixel coordinates and corresponding color values associated therewith and wherein further said determination module is configured to determine a likely illuminant for said captured image by comparing said first group against a second group of pixel coordinates and corresponding color values associated therewith stored in a data structure, wherein said data structure stores a plurality of different groupings of pixel coordinates and corresponding color values associated with different illuminant sources.

* * * * *